(12) United States Patent
Capata et al.

(10) Patent No.: US 8,180,173 B2
(45) Date of Patent: May 15, 2012

(54) FLASH ARTIFACT EYE DEFECT CORRECTION IN BLURRED IMAGES USING ANISOTROPIC BLURRING

(75) Inventors: Adrian Capata, Galway (IE); Florin Nanu, Bucharest (RO); Alexandru Drimbarean, Galway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 1008 days.

(21) Appl. No.: 11/859,164

(22) Filed: Sep. 21, 2007

(65) Prior Publication Data

US 2009/0080796 A1 Mar. 26, 2009

(51) Int. Cl.
*G06K 9/40* (2006.01)
(52) U.S. Cl. ........ 382/275; 382/162; 382/167; 382/254; 358/1.1; 358/3.26
(58) Field of Classification Search .................. None
See application file for complete search history.

(56) References Cited

U.S. PATENT DOCUMENTS

| | | | |
|---|---|---|---|
| 4,974,010 A | 11/1990 | Cleveland et al. | |
| 5,251,019 A | 10/1993 | Moorman et al. | |
| 5,374,956 A | 12/1994 | D'Luna | |
| 5,392,088 A | 2/1995 | Abe et al. | |
| 5,428,723 A | 6/1995 | Ainscow et al. | |
| 5,510,215 A | 4/1996 | Prince et al. | |
| 5,599,766 A | 2/1997 | Boroson et al. | |
| 5,686,383 A | 11/1997 | Long et al. | |
| 5,747,199 A | 5/1998 | Roberts et al. | |
| 5,751,836 A | 5/1998 | Wildes et al. | |
| 5,756,239 A | 5/1998 | Wake | |
| 5,756,240 A | 5/1998 | Roberts et al. | |
| 5,802,220 A | 9/1998 | Black et al. | |
| 5,889,277 A | 3/1999 | Hawkins et al. | |
| 5,889,554 A | 3/1999 | Mutze | |
| 5,909,242 A | 6/1999 | Kobayashi et al. | |
| 5,981,112 A | 11/1999 | Roberts | |
| 6,009,209 A * | 12/1999 | Acker et al. ................ | 382/275 |
| 6,028,960 A | 2/2000 | Graf et al. | |
| 6,035,072 A | 3/2000 | Read | |

(Continued)

FOREIGN PATENT DOCUMENTS

DE 3729324 A1 3/1989

(Continued)

OTHER PUBLICATIONS

Okumura et al. ("Augmented Reality Based on Estimation of Defocusing and Motion Blurring from Captured Images", 2006, IEEE, pp. 219-225.*

(Continued)

*Primary Examiner* — Sath V Perungavoor
*Assistant Examiner* — Jason Heidemann
(74) *Attorney, Agent, or Firm* — Andrew V. Smith

(57) ABSTRACT

A method and apparatus for providing defect correction in blurred images is disclosed. For one embodiment of the invention, a digital image is acquired. One or more candidate defect regions in the image are identified. The candidate defect regions are corrected and responsive to the image being blurred, the corrected regions of the image are blurred. For one embodiment of the invention, a digital image is acquired and one or more candidate eye defect regions in the image are identified. The candidate eye defect regions are corrected and if the image is blurred, the corrected regions of the image are blurred accordingly.

56 Claims, 3 Drawing Sheets

U.S. PATENT DOCUMENTS

| | | |
|---|---|---|
| 6,061,462 A | 5/2000 | Tostevin et al. |
| 6,081,606 A | 6/2000 | Hansen et al. |
| 6,114,075 A | 9/2000 | Long et al. |
| 6,124,864 A | 9/2000 | Madden et al. |
| 6,134,339 A | 10/2000 | Luo |
| 6,269,175 B1 | 7/2001 | Hanna et al. |
| 6,297,071 B1 | 10/2001 | Wake |
| 6,297,846 B1 | 10/2001 | Edanami |
| 6,326,108 B2 | 12/2001 | Simons |
| 6,330,029 B1 | 12/2001 | Hamilton et al. |
| 6,335,990 B1 | 1/2002 | Chen et al. |
| 6,360,003 B1 | 3/2002 | Doi et al. |
| 6,365,304 B2 | 4/2002 | Simons |
| 6,387,577 B2 | 5/2002 | Simons |
| 6,407,777 B1 | 6/2002 | DeLuca |
| 6,535,244 B1 | 3/2003 | Lee et al. |
| 6,555,278 B1 | 4/2003 | Loveridge et al. |
| 6,567,536 B2 | 5/2003 | McNitt et al. |
| 6,599,668 B2 | 7/2003 | Chari et al. |
| 6,602,656 B1 | 8/2003 | Shore et al. |
| 6,607,873 B2 | 8/2003 | Chari et al. |
| 6,618,491 B1 | 9/2003 | Abe |
| 6,625,396 B2 | 9/2003 | Sato |
| 6,643,387 B1 | 11/2003 | Sethuraman et al. |
| 6,863,368 B2 | 3/2005 | Sadasivan et al. |
| 6,892,029 B2 | 5/2005 | Tsuchida et al. |
| 6,947,609 B2 | 9/2005 | Seeger et al. |
| 6,961,518 B2 | 11/2005 | Suzuki |
| 7,019,331 B2 | 3/2006 | Winters et al. |
| 7,072,525 B1 | 7/2006 | Covell |
| 7,084,037 B2 | 8/2006 | Gamo et al. |
| 7,160,573 B2 | 1/2007 | Sadasivan et al. |
| 7,180,238 B2 | 2/2007 | Winters |
| 7,195,848 B2 | 3/2007 | Roberts |
| 7,315,630 B2 | 1/2008 | Steinberg et al. |
| 7,315,631 B1 | 1/2008 | Corcoran et al. |
| 7,316,630 B2 | 1/2008 | Tsukada et al. |
| 7,316,631 B2 | 1/2008 | Tsunekawa |
| 7,317,815 B2 | 1/2008 | Steinberg et al. |
| 7,336,821 B2 | 2/2008 | Ciuc et al. |
| 7,369,712 B2 | 5/2008 | Steinberg et al. |
| 7,403,643 B2 | 7/2008 | Ianculescu et al. |
| 7,453,510 B2 | 11/2008 | Kolehmainen et al. |
| 7,460,695 B2 | 12/2008 | Steinberg et al. |
| 7,469,071 B2 | 12/2008 | Drimbarean et al. |
| 7,551,755 B1 | 6/2009 | Steinberg et al. |
| 7,565,030 B2 | 7/2009 | Steinberg et al. |
| 7,599,577 B2 | 10/2009 | Ciuc et al. |
| 7,676,108 B2 | 3/2010 | Steinberg et al. |
| 7,692,696 B2 | 4/2010 | Steinberg et al. |
| 7,697,778 B2 | 4/2010 | Steinberg et al. |
| 7,865,036 B2 | 1/2011 | Ciuc et al. |
| 2001/0036307 A1 | 11/2001 | Hanna et al. |
| 2002/0006163 A1 | 1/2002 | Hibi et al. |
| 2002/0042659 A1 | 4/2002 | Ingimarsson |
| 2002/0122133 A1 | 9/2002 | Ejima |
| 2003/0007687 A1* | 1/2003 | Nesterov et al. ............... 382/167 |
| 2003/0052991 A1 | 3/2003 | Stavely et al. |
| 2003/0058361 A1 | 3/2003 | Yang |
| 2003/0091225 A1 | 5/2003 | Chen |
| 2003/0103076 A1 | 6/2003 | Neuman |
| 2003/0151674 A1 | 8/2003 | Lin |
| 2003/0152271 A1 | 8/2003 | Tsujino et al. |
| 2003/0169818 A1 | 9/2003 | Obrador |
| 2003/0193699 A1 | 10/2003 | Tay |
| 2003/0219172 A1 | 11/2003 | Caviedes et al. |
| 2004/0042659 A1 | 3/2004 | Guo et al. |
| 2004/0066981 A1 | 4/2004 | Li et al. |
| 2004/0076335 A1 | 4/2004 | Kim |
| 2004/0090532 A1 | 5/2004 | Imada |
| 2004/0120598 A1 | 6/2004 | Feng |
| 2004/0120698 A1 | 6/2004 | Hunter |
| 2004/0169767 A1 | 9/2004 | Norita et al. |
| 2004/0212699 A1 | 10/2004 | Molgaard |
| 2004/0218057 A1 | 11/2004 | Yost et al. |
| 2004/0218067 A1 | 11/2004 | Chen et al. |
| 2005/0010108 A1 | 1/2005 | Rahn et al. |
| 2005/0019000 A1 | 1/2005 | Lim et al. |
| 2005/0031224 A1 | 2/2005 | Prilutsky et al. |
| 2005/0041121 A1 | 2/2005 | Steinberg et al. |
| 2005/0041123 A1 | 2/2005 | Ansari et al. |
| 2005/0047672 A1 | 3/2005 | Ben-Ezra et al. |
| 2005/0052553 A1 | 3/2005 | Kido et al. |
| 2005/0057687 A1 | 3/2005 | Irani et al. |
| 2005/0068446 A1 | 3/2005 | Steinberg et al. |
| 2005/0068452 A1 | 3/2005 | Steinberg et al. |
| 2005/0140801 A1 | 6/2005 | Prilutsky et al. |
| 2005/0201637 A1 | 9/2005 | Schuler et al. |
| 2005/0219391 A1 | 10/2005 | Sun et al. |
| 2005/0231625 A1 | 10/2005 | Parulski et al. |
| 2005/0259864 A1 | 11/2005 | Dickinson et al. |
| 2005/0270381 A1 | 12/2005 | Owens et al. |
| 2006/0006309 A1 | 1/2006 | Dimsdale et al. |
| 2006/0017837 A1 | 1/2006 | Sorek et al. |
| 2006/0023099 A1 | 2/2006 | Vitsnudel et al. |
| 2006/0038891 A1 | 2/2006 | Okutomi et al. |
| 2006/0039690 A1 | 2/2006 | Steinberg et al. |
| 2006/0093212 A1 | 5/2006 | Steinberg et al. |
| 2006/0093238 A1* | 5/2006 | Steinberg et al. ............. 382/275 |
| 2006/0098237 A1 | 5/2006 | Steinberg et al. |
| 2006/0098867 A1* | 5/2006 | Gallagher ...................... 382/167 |
| 2006/0098890 A1 | 5/2006 | Steinberg et al. |
| 2006/0098891 A1 | 5/2006 | Steinberg et al. |
| 2006/0119710 A1 | 6/2006 | Ben-Ezra et al. |
| 2006/0120599 A1 | 6/2006 | Steinberg et al. |
| 2006/0125938 A1 | 6/2006 | Ben-Ezra et al. |
| 2006/0140455 A1 | 6/2006 | Costache et al. |
| 2006/0170786 A1 | 8/2006 | Won |
| 2006/0171464 A1 | 8/2006 | Ha |
| 2006/0187308 A1 | 8/2006 | Lim et al. |
| 2006/0204034 A1 | 9/2006 | Steinberg et al. |
| 2006/0204054 A1 | 9/2006 | Steinberg et al. |
| 2006/0204110 A1 | 9/2006 | Steinberg et al. |
| 2006/0285754 A1 | 12/2006 | Steinberg et al. |
| 2007/0025714 A1 | 2/2007 | Shiraki |
| 2007/0058073 A1 | 3/2007 | Steinberg et al. |
| 2007/0110305 A1 | 5/2007 | Corcoran et al. |
| 2007/0133893 A1 | 6/2007 | Jerdev |
| 2007/0177817 A1* | 8/2007 | Szeliski et al. ................ 382/275 |
| 2007/0189748 A1 | 8/2007 | Drimbarean et al. |
| 2007/0201724 A1 | 8/2007 | Steinberg et al. |
| 2007/0216798 A1 | 9/2007 | Northcott et al. |
| 2007/0269108 A1 | 11/2007 | Steinberg et al. |
| 2007/0296833 A1 | 12/2007 | Corcoran et al. |
| 2008/0037827 A1 | 2/2008 | Corcoran et al. |
| 2008/0037839 A1 | 2/2008 | Corcoran et al. |
| 2008/0037840 A1 | 2/2008 | Steinberg et al. |
| 2008/0043121 A1 | 2/2008 | Prilutsky et al. |
| 2008/0175481 A1 | 7/2008 | Petrescu et al. |
| 2008/0219581 A1 | 9/2008 | Albu et al. |
| 2008/0220750 A1 | 9/2008 | Steinberg et al. |
| 2008/0231713 A1 | 9/2008 | Florea et al. |
| 2008/0232711 A1 | 9/2008 | Prilutsky et al. |
| 2008/0240555 A1 | 10/2008 | Nanu et al. |
| 2008/0292193 A1 | 11/2008 | Bigioi et al. |
| 2008/0309769 A1 | 12/2008 | Albu et al. |
| 2008/0309770 A1 | 12/2008 | Florea et al. |
| 2008/0317358 A1* | 12/2008 | Bressan et al. ................ 382/224 |
| 2009/0003652 A1 | 1/2009 | Steinberg et al. |
| 2009/0080713 A1 | 3/2009 | Bigioi et al. |
| 2009/0080797 A1 | 3/2009 | Nanu et al. |
| 2009/0167893 A1 | 7/2009 | Susanu et al. |
| 2009/0179999 A1 | 7/2009 | Albu et al. |
| 2009/0185753 A1 | 7/2009 | Albu et al. |
| 2009/0190803 A1 | 7/2009 | Neghina et al. |
| 2009/0196466 A1 | 8/2009 | Capata et al. |
| 2009/0263022 A1 | 10/2009 | Petrescu et al. |
| 2009/0273685 A1 | 11/2009 | Ciuc et al. |
| 2010/0201826 A1 | 8/2010 | Steinberg et al. |
| 2010/0201827 A1 | 8/2010 | Steinberg et al. |
| 2010/0238309 A1 | 9/2010 | Florea et al. |
| 2010/0328472 A1 | 12/2010 | Steinberg et al. |
| 2011/0069207 A1 | 3/2011 | Steinberg et al. |
| 2011/0074985 A1 | 3/2011 | Ciuc et al. |
| 2011/0115928 A1 | 5/2011 | Corcoran et al. |
| 2011/0193989 A1 | 8/2011 | Steinberg et al. |

FOREIGN PATENT DOCUMENTS

| | | |
|---|---|---|
| DE | 10154203 A1 | 6/2002 |
| DE | 10107004 A1 | 9/2002 |
| EP | 944251 B1 | 4/2003 |
| EP | 1583033 A2 | 10/2005 |
| EP | 1 762 981 A | 3/2007 |
| EP | 1779322 B1 | 1/2008 |
| EP | 1429290 B1 | 7/2008 |
| JP | 10285542 A2 | 10/1998 |
| JP | 11327024 A2 | 11/1999 |
| JP | 2008-520117 T | 6/2008 |
| WO | WO-9843436 A1 | 10/1998 |
| WO | WO-0245003 A1 | 6/2002 |
| WO | WO-03071484 A1 | 8/2003 |
| WO | WO-2004001667 A2 | 12/2003 |
| WO | WO-2004036378 A2 | 4/2004 |
| WO | WO-2006050782 A1 | 5/2006 |
| WO | 2007/057063 A | 5/2007 |
| WO | WO 2007/093199 A2 | 8/2007 |
| WO | WO 2007/093199 A3 | 8/2007 |
| WO | WO 2007/142621 A1 | 12/2007 |
| WO | WO-2007143415 A2 | 12/2007 |
| WO | WO 2008/017343 A1 | 2/2008 |
| WO | WO2008131438 A2 | 10/2008 |
| WO | 2008/151802 A1 | 12/2008 |
| WO | 2009/036822 A1 | 3/2009 |
| WO | WO 2009/036793 A1 | 3/2009 |
| WO | 2009/089847 A1 | 7/2009 |

OTHER PUBLICATIONS

Peck "Beginning GIMP: From Novice to Professional—Chapter 10, Advanced Compositing", 2006, Springer-Verlag NewYork, pp. 381-384.*
Bertalmio et al. "Real-Time, Accurate Depth of Field Using Anisotropic Diffusion and Programmable Graphics Cards," 2004, 3DPVT '04, pp. 767-773.*
PCT Written Opinion of the International Preliminary Examining Authority, PCT/EP2008/004920, dated Mar. 9, 2009, 11 pages.
Andrews, H.C. et al., "Digital Image Restoration", Prentice Hall, 1977.
Bates et al., "Some Implications of Zero Sheets for Blind Deconvolution and Phase Retrieval", J. Optical Soc. Am. A, 1990, pp. 468-479, vol. 7.
Ben Ezra, Moshe et al., "Motion Deblurring Using Hybrid Imaging", Proceedings IEEE Computer Society Conference on Computer Vision and Pattern Recognition. 2003.
Ben-Ezra, M. et al., "Motion-Based Motion Deblurring", IEEE Transactions on Pattern Analysis and Machine Intelligence, 2004, pp. 689-698, vol. 26—Issue 6.
Bennett, Eric P. et al., "Video Enhancement Using Per-Pixel Virtual Exposures", International Conference on Computer Graphics and Interactive Techniques, ACM Siggraph, 2005, pp. 845-852.
Bhaskaran, V. et al., "Motion estimation using a computation-constrained criterion", Digital Signal Processing Proceedings, 1997. pp. 229-232, vol. I.
Bones et al., "Deconvolution and Phase Retrieval With Use of Zero Sheets", J. Optical Soc. Am. A. 1995, pp. 1,842-1,857, vol. 12.
Chen-Kuei Y. et al., "Color image sharpening by moment-preserving technique", Signal Processing, 1995, pp. 397-403, vol. 45—Issue 3, Elsevier Science Publishers.
Crowley, J. et al., "Multi-modal tracking of faces for video communication, http://citeseer.ist.psu.edu/crowley97multimodal.html", In Computer Vision and Patent Recognition, 1997.
Deever, A., "In-camera all-digital video stabilization", Proceedings of the International Conference on Decision Support Systems.Proceedings of ISDSS, 2006, pp. 190-193.
Demir, B. et al., "Block motion estimation using adaptive modified two-bit transform", 2007, pp. 215-222, vol. 1—Isuue 2.
Dufournaud et al., "Matching Images With Different Resolutions", IEEE Conference Proceedings on Computer Vision and Pattern Recognition, 2000.
Elad et al., "Restoration of a Single Superresolution Image from several Blurred, Noisy and Undersampled Measured Images", IEEE Trans on Image Processing, 1997, vol. 6—Issue 12.
Elad, Michael et al., "Superresolution Restoration of an Image Sequence: Adaptive Filtering Approach", IEEE Transactions on Image Processing, 1999, pp. 529-541, vol. 8—Issue 3.
Favaro, Paolo, "Depth from focus/defocus, http://homepages.inf.ed.ac.uk/rbf/Cvonline/LOCAL_COPIES/FAVARO1/dfdtutorial.html.", 2002.
Feng, J. et al., "Adaptive block matching motion estimation algorithm using bit plane matching", ICIP, 1995, pp. 496-499.
Fujita K. et al., An edge-adaptive iterative method for image restoration, Singapore ICCS/ISITA '92."Communications on the Move" Singapore Nov. 16-20, 1992, New York, NY, USA, IEEE, US, Nov. 16, 1992,pp. 361-365, XP010066997, ISBN: 0-7803-0803-4.
Jansson, Peter A., "Chapter 1: Convolution and Related Concepts", Deconvolution of Images and Spectra, 1997, 2nd. Edition, Academic Press.
Jiang, Wei et al., "Dense Panoramic Imaging and 3D Reconstruction by Sensors Fusion, http://rlinks2.dialog.com/NASApp/ChannelWEB/DialogProServlet?ChName=engineering", Japan Sci. and Technol. Agency, JPN(JST); National Inst. Industrial Safety, JPN Nippon Kikai Gakkai Robotikusu, Mckatoronikusu Koenkai Koen Ronbunshu (CD-ROM), 2006, pp. 2P1-C15.
Ko, S. et al., "Fast digital image stabilizer based on gray-coded bit-plane matching", IEEE Transactions on Consumer Electronics, 1999, pp. 598-603, vol. 45—Issue 3.
Lane et al., "Automatic multidimensional deconvolution", J. Opt. Soc. Am. A, 1987, pp. 180-188, vol. 4—Issue 1.
Lhuillier, M. et al., "A quasi-dense approach to surface reconstruction from uncalibrated images, http://rlinks2.dialog.com/NASApp/ChannelWEB/DialogProServlet?ChName=engineering", IEEE Transactions on Pattern Analysis and Machine Intelligence, 2005, pp. 418-433, vol. 27—Issue 3, IEEE Comput. Soc.
Mase, Milsuhito et al., "A Wide Dynamic Range CMOS image Sensor with Multiple Exposure-Time Signal Outputs and 12-bit Column-Parallel Cyclic A/D Converters", IEEE Journal of Solid-State Circuits, 2005, vol. 40—Issue 12.
Natarajan B. et al., "Low-complexity block-based motion estimation via one-bit transforms", IEEE Trans. Circuit Syst. Video Technol, 1997, pp. 702-706, vol. 7—Issue 5.
Oppenheim, A.V. et al., "The Importance of Phase in Signals, XP008060042, ISSN: 0018-9219.", Proceedings of the IEEE, 1981, pp. 529-541, vol. 69—Issue 5.
Park, Sung Cheol et al., "Super-resolution image reconstruction: a technical overview, ISSN: 1053-5888. DOI: 10.1109/MSP.2003.1203207.", Signal Processing Magazine, 2003, pp. 21-36, vol. 20—Issue 3, IEEE Publication.
Patti A. et al., "Super-Resolution video reconstruction with arbitrary sampling lattices and non-zero aperture time http://citeseer.ist.psu.edu/patti97super.html", In IEEE Transactions on Image Processing, 1997, pp. 1064-1078.
PCT International Preliminary Report on Patentability, for PCT Application No. PCT/EP2005/011011, dated Jan. 22, 2007, 8 pages.
PCT Notification of Transmittal of the International Search Report and the Written Opinion of the International Searching Authority, or the Declaration for PCT application No. PCT/US2007/069638, dated Mar. 5,2008, 9 pages.
PCT Notification of Transmittal of the International Search Report and the Written Opinion of the International Searching Authority, or the Declaration, for PCT Application No. PCT/EP2005/011011, dated Apr. 24, 2006, 12 pages.
PCT Notification of Transmittal of the International Search Report and the Written Opinion of the International Searching Authority, or the Declaration, for PCT Application No. PCT/EP2007/009939, dated May 21, 2008, 13 pages.
PCT Notification of Transmittal of the International Search Report and the Written Opinion of the International Searching Authority, or the Declaration, for PCT Application No. PCT/EP2008/004729, dated Oct. 29, 2008, 9 pages.
Pulli, Kari et al., "Robust Meshes from Multiple Range Maps, http://citeseer.ist.psu.edu/pulli97robust.html", In Proc. IEEE International Conference on Recent Advances in 3-D Digital Imaging and Modeling, 1997.
Rahgozar et al., "Motion Estimation Based on Time-Sequentially Sampled Imagery", IEEE Transactions on Image Processing, 1995.

Rav-Acha, A. et al., "Restoration of Multiple Images with Motion Blur in Different Directions, XP002375829, ISBN: 0-7695-0813-8", Proceedings Fifth IEEE Workshop on Applications on Computer Vision IEEE Comput. Soc, 2000, pp. 22-28.

Sasaki et al., "A Wide Dynamic Range CMOS Image Sensor with Multiple Short-Time Exposures", IEEE Proceedings on Sensors, 2004, pp. 967-972, vol. 2.

Sauer, K. et al., "Efficient Block Motion Estimation Using Integral Projections", IEEE Trans. Circuits, Systems for video Tech, 1996, pp. 513-518, vol. 6—Issue 5.

Schultz, Richard R. et al., "Extraction of High-Resolution Frames from Video Sequences, http://citeseer.ist.psu.edu/schultz96extraction.html", IEEE transactions on image processing, 1996, pp. 996-1011.

Seldin et al., "Iterative blind deconvolution algorithm applied to phase retrieval", J. Opt. Soc. Am. A, 1990, pp. 428-433, vol. 7—Issue 3.

She, Peng et al., "Motion View Reconstruction Method with Real Object Image based on Virtual Object Movement, http://rlinks2.dialog.com/NASApp/ChannelWEB/DialogProServlet?ChName=engineering", Eizo Joho Media Gakkai Gijutsu Hokoku, 2005, pp. 67-70, vol. 29—Issue 17.

Siu, Angus et al., "Image registration for image-based rendering, http://rlinks2.dialog.com/NASApp/ChannelWEB/DialogProServlet?ChName=engineering", IEEE Transactions on Image Processing, 2005, pp. 241-252, vol. 14—Issue 2.

Trussell, H.J. et al., "Identification and restoration of spatially variant motion blurs in sequential images, XP002375828", IEEE Transactions on Image Processing, 1992, pp. 123-126, vol. 1—Issue 1.

Uomori, K. et al., "Automatic image stabilizing system by fulidigital signal processing" IEEE Transactions on Consumer Electronics, 1990, vol. 36, No. 3, pp. 510-519.

Zhang, Junping et al., "Change detection for the urban area based on multiple sensor information fusion, http://rlinks2.dialog.com/NASApp/ChannelWEB/DialogProServlet?ChName=engineering", IEEE International Geoscience and Remote Sensing Symposium, 2005, p. 4, IEEE.

Cannon M., "Blind Deconvolution of Spatially Invariant Image Blurs with Phase," IEEE Transactions on Acoustics, Speech, and Signal Processing, 1976, vol. ASSP-24, No. 1.

Deller J. et al., "Discrete-Time Processing of Speech Signals," 1999, 2nd. Edition, Wiley-IEEE Press.

Deng G. et al., "The study of logarithmic image processing model and its application to image enhancement," IEEE Trans. on Image Processing, 1995, pp. 506-512, vol. 4.

Final Office Action mailed Nov. 5, 2008, for U.S. Appl. No. 10/986,562, filed Nov. 10, 2004.

Final Office Action mailed Nov. 13, 2008, for U.S. Appl. No. 10/985,657, filed Nov. 10, 2004.

Final Office Action mailed Nov. 13, 2008, for U.S. Appl. No. 11/566,180, filed Dec. 1, 2006.

Final Office Action mailed Nov. 24, 2008, for U.S. Appl. No. 10/985,650, filed Nov. 10, 2004.

Golub G. H. et al., "Matrix Computations," 1996, 3rd edition, John Hopkins University Press, Baltimore.

Gunturk et al., "High-Resolution Image Reconstruction from Multiple Differently Exposed Images," IEEE Signal Processing Letters, 2006, vol. 13, No. 4.

Hayes M., "Statistical Digital Signal Processing and Modeling," 1996, Wiley.

Haykin S., "Adaptive filter theory," 1996, Prentice Hall.

Jannson, Peter A., "Deconvolution of Images and Spectra," 1997, 2nd. Edition, Academic Press.

Jourlin M. et al., "Logarithmic image processing the mathematical and physical framework for the representation and processing of transmitted images," Advances in Imaging and Electron Physics, 2001, pp. 129-196, vol. 115.

Kuglin C. D. et al., "The phase correlation image alignment method," Proc. Int. Conf. Cybernetics and Society, 1975, pp. 163-165, IEEE, Bucharest, Romania.

Lagendijk R. L. et al., "Iterative Identification and Restoration of Images," 1991, Kluwer Academic.

Non-Final Office Action mailed Apr. 3, 2008, for U.S. Appl. No. 10/985,650, filed Nov. 10, 2004.

Non-Final Office Action mailed Apr. 4, 2008, for U.S. Appl. No. 10/986,562, filed Nov. 10, 2004.

Non-Final Office Action mailed Apr. 21, 2009, for U.S. Appl. No. 10/985,650, filed Nov. 10, 2004.

Non-Final Office Action mailed Apr. 22, 2009, for U.S. Appl. No. 10/986,562, filed Nov. 10, 2004.

Non-Final Office Action mailed Jun. 1, 2009, for U.S. Appl. No. 10/985,657, filed Nov. 10, 2004.

Non-Final Office Action mailed Jun. 10, 2009, for U.S. Appl. No. 11/566,180, filed Dec. 1, 2006.

Non-Final Office Action mailed Mar. 18, 2008, for U.S. Appl. No. 10/985,657, filed Nov. 10, 2004.

Non-Final Office Action mailed Mar. 21, 2008, for U.S. Appl. No. 11/566,180, filed Dec. 1, 2006.

Non-Final Office Action mailed May 11, 2009, for U.S. Appl. No. 12/199,680, filed Aug. 27, 2008.

Non-Final Office Action mailed May 29, 2009, for U.S. Appl. No. 12/199,710, filed Aug. 27, 2008.

PCT International Preliminary Report on Patentability for PCT Application PCT/US2007/069638, dated Dec. 10, 2008, 5 pages.

PCT Written Opinion of the International Preliminary Examining Authority, PCT/EP2005/011011, dated Oct. 24, 2006, 4 pages.

Pickup, Lyndsey et al., "Optimizing and Learning for Super-resolution," BMVC, Sep. 4-7, 2006.

Yuan, Lu et al., "Image Deblurring with Blurred/Noisy Image Pairs," SIGGRAPH07, Aug. 5-9, 2007.

Zitova, Barbara et al., "Image registration methods: a survey," Image and Vision Computing, 2003, pp. 977-1000, vol. 21.

PCT Notification of Transmittal of the International Search Report and the Written Opinion of the International Searching Authority, or the Declaration, for PCT Application No. PCT/EP2008/004920, dated on Nov. 14, 2008, 15 pages.

Marziliano P et al.: "A no-reference perceptual blur metric" IEEE ICIP 2002, vol. 3, Sep. 22, 2002, pp. 57-60.

Shoa T et al.: "Extracting a Focused Image from Several out of Focus Micromechanical Structure Images" Acoustics, Speech, and Signal Processing, 2004, Proceedings, (ICASSP , 04), IEEE International Conference on Montreal, Quebec, Canada May 17-21, 2004, Piscataway, NJ, USA,IEEE, vol. 3, May 17, 2004, pp. 505-508.

Schildkraut J S et al.: "A fully Automatic Redeye Detection and Correction Algorithm" IEEE ICIP 2002, vol. 1, Sep. 22, 2002, pp. 801-803.

Perona P et al.: "Scale-space and Edge Detection Using Anisotropic Diffusion" IEEE Transactions on Pattern Analysis and Machine Intelligence, IEEE Service Center, Los Alamitos, CA, US, vol. 12, No. 7, Jan. 1, 1990, pp. 629-639.

Y Okumura B et al.: "Image Composition Based 1-18 on Blur Estimation from Captured Image for Augmented Reality" Virtual Reality, 2006, IEEE Alexandria, VA, USA Mar. 25-29, 2006, Piscataway, NJ, USA,IEEE, Mar. 25, 2006, pp. 18-18.

Kaufman, H. et al.: "Survey of Estimation Techniques in Image Restoration," IEEE Control Systems Magazine, IEEE Service Center, Piscataway, NJ, USA, Jan. 1, 1991, XP000573241, ISSN: 0272-1708, pp. 16-24.

PCT Written Opinion of the International Search Authority, for PCT Application No. PCT/EP2008/004920, dated on Mar. 21, 2010, 9 pages.

PCT International Preliminary Report on Patentability Chapter II (IPEA/409), for PCT Application No. PCT/EP2008/004920, dated on Mar. 21, 2010, 13 pages.

Okumura B. et al., "Image Composition Based on Blur Estimation from Captured Image for Augmented Reality", Virtual Reality, 2006, pp. 1-8.

Wikipedia reference: Prewitt. Retrieved from the Internet on Oct. 20, 2011, URL: http://en.wikipedia.org/wiki/Prewitt, 3 Pages.

Mehmet K. Ozkan, M. Ibrahim Sezan, and A. Murat Tekalp, Adaptive Motion-Compensated Filtering of Noisy Image Sequences, IEEE Transactions on Circuits and Systems for Video Technology, vol. 3, No. 4, Aug. 1993, pp. 277-290.

* cited by examiner

FLASH ARTIFACT EYE DEFECT CORRECTION IN BLURRED IMAGES USING ANISOTROPIC BLURRING

FIELD

Embodiments of the invention relate generally methods and apparatuses for digital image correction in blurred images, while particular embodiments relate to the correction of eye defects in blurred images.

BACKGROUND

The detection and correction of image defects (e.g., eye defects) is known in the art. For example, U.S. patent application Ser. No. 11/282,955, now U.S. Pat. No. 7,599,577, discloses a method for digital image artifact correction. The disclosed method is concerned with the detection and correction of hybrid flash artifacts in an image including red eye defects and non-red eye defects, such as defect regions of the eye which may not be fully red, or may display other artifacts, for example, a complex pattern of portions that are yellow, golden or white or a combination thereof.

In general, however, conventional image defect correction schemes involve identifying a region to be corrected and altering the color level of that region to correct the eye defect.

However, in cases where the image is blurred, for example due to camera motion or more likely in flash images, images in which the focus point is not on the subject, such correction methods are not as effective. For example, eye defects in blurred images influence and are influenced by surrounding regions, for example skin, iris, and eyelashes and may not have sharp edges or clear appearances. Thus, the corrected eye defects in the image can be sharply defined within a blurred area.

Conventional methods are quite effective when performed on sharp images due to the fact that there is a clearly defined border between the corrected region and the remainder of the image. However, in blurred images, such methods result in images having sharp corrected regions, which contrast with the fadedness of the remainder of the image, thereby appearing unnatural.

SUMMARY

In accordance with one embodiment of the invention, a digital image is acquired. One or more candidate defect regions in the image are identified. The candidate defect regions are corrected and responsive to the image being blurred, the corrected regions of the image are blurred.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings:

FIG. 3(*b*) illustrates a corresponding set of images which have been subjected to an edge detector.

DETAILED DESCRIPTION

Methods and apparatuses are disclosed that provide digital image artifact correction in blurred images. For one embodiment of the invention, to avoid producing images in which corrected eye defects contrast sharply with the remaining blurred image, the corrected eye defect pixels are blurred and blended into the image to thereby produce a natural effect. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Embodiments of the invention are applicable to wide range of systems in which image processing and image correction are effected.

Figure 1:
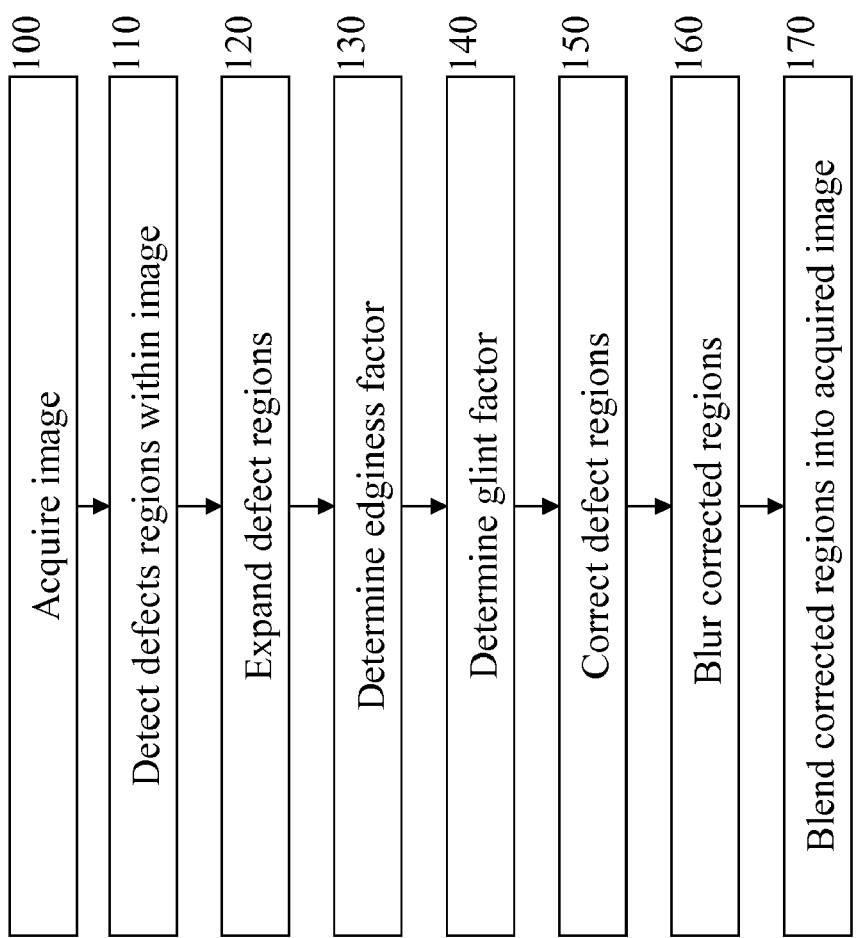
FIG. 1 illustrates a process for effecting image defect correction in accordance with one embodiment of the invention.

FIG. 1 illustrates a process for effecting image defect correction in accordance with one embodiment of the invention. At operation 100, an image (e.g., a digital flash image) is acquired in an otherwise conventional manner. The image may contain defects. For example, for a digital flash image, the image may include artifacts such as red-eye, yellow-eye, white-eye or combinations thereof as well as glint regions due to the flash. At operation 110 defect regions within the image are detected. For example, a conventional eye defect detector may be applied to the image. During conventional defect detection, defect pixels are identified and subsequently grouped into candidate regions comprising a plurality of contiguous (or generally contiguous) pixels.

Figure 2:
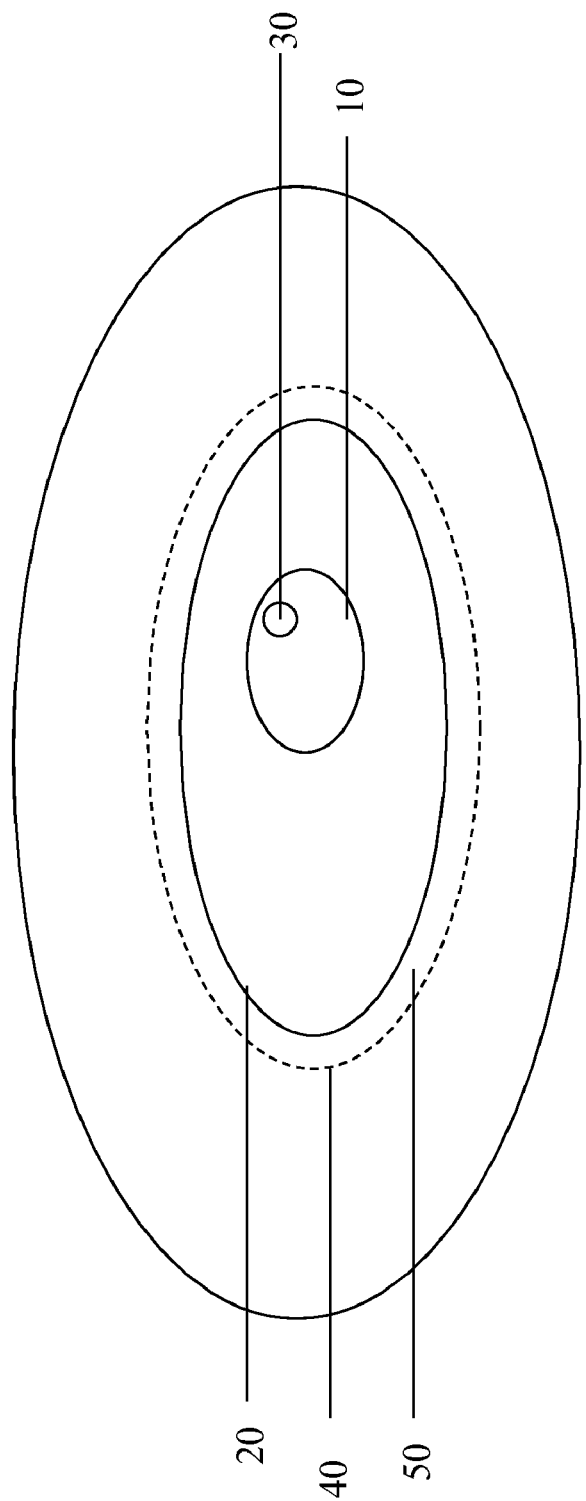
FIG. 2 illustrates candidate regions of an eye defect image in accordance with one embodiment of the invention.

FIG. 2 illustrates candidate regions of an eye defect image in accordance with one embodiment of the invention. As shown in FIG. 2, candidate regions may comprise certain defect regions 10, such as pixels with a very high red hue and higher saturation and lightness values than pixels in the nearby non-certain eye defect regions 20. Defect regions may have a relatively red hue and somewhat higher saturation and lightness values than pixels in the non-certain eye defect regions 20 or holes 30 within the candidate eye defect regions, such as pixels having little or no redness, and perhaps a very low or very high luminance value, for example glint pixels.

Referring again to FIG. 1, at operation 120 the detected defect regions are expanded. For example, as shown in FIG. 2, each candidate region is bounded by a border, and in one embodiment, a boundary region 40 is defined to include the border and a portion of the eye and/or face surrounding the candidate region. For one embodiment, the boundary region 40 comprises the candidate region border expanded by 2 pixels above and below the candidate region.

A patch of pixels corresponding to each boundary region is then extracted and subjected to further processing as described below.

Referring again to FIG. 1, at operation 130 an edginess factor is determined. For example, an edge detector, for example, Prewitt, is applied to each patch to determine a measure of the sharpness of those regions of the image. The edge detector analyzes the image for points at which the luminous intensity of the pixels changes markedly. Preferably, the edge detector analyzes the pixels in an annular region 50, defined between the candidate region 20 border and the boundary region 40, as shown in FIG. 2, to ascertain the sharpness of the patch. The greater the number of such points detected by the detector, the sharper the image.

In one embodiment, if the change in intensity between two neighboring pixels or two neighboring groups of pixels in the region 50 of the patch is above a threshold value, the point is recorded.

In one embodiment, the edge detector applies a lower threshold value where the pixels being analyzed are darker. This is due to the fact that even though edges are more visible in regions of darker pixels, the luminous intensity of darker pixels at the edges changes less markedly than with lighter pixels.

Figure 3:
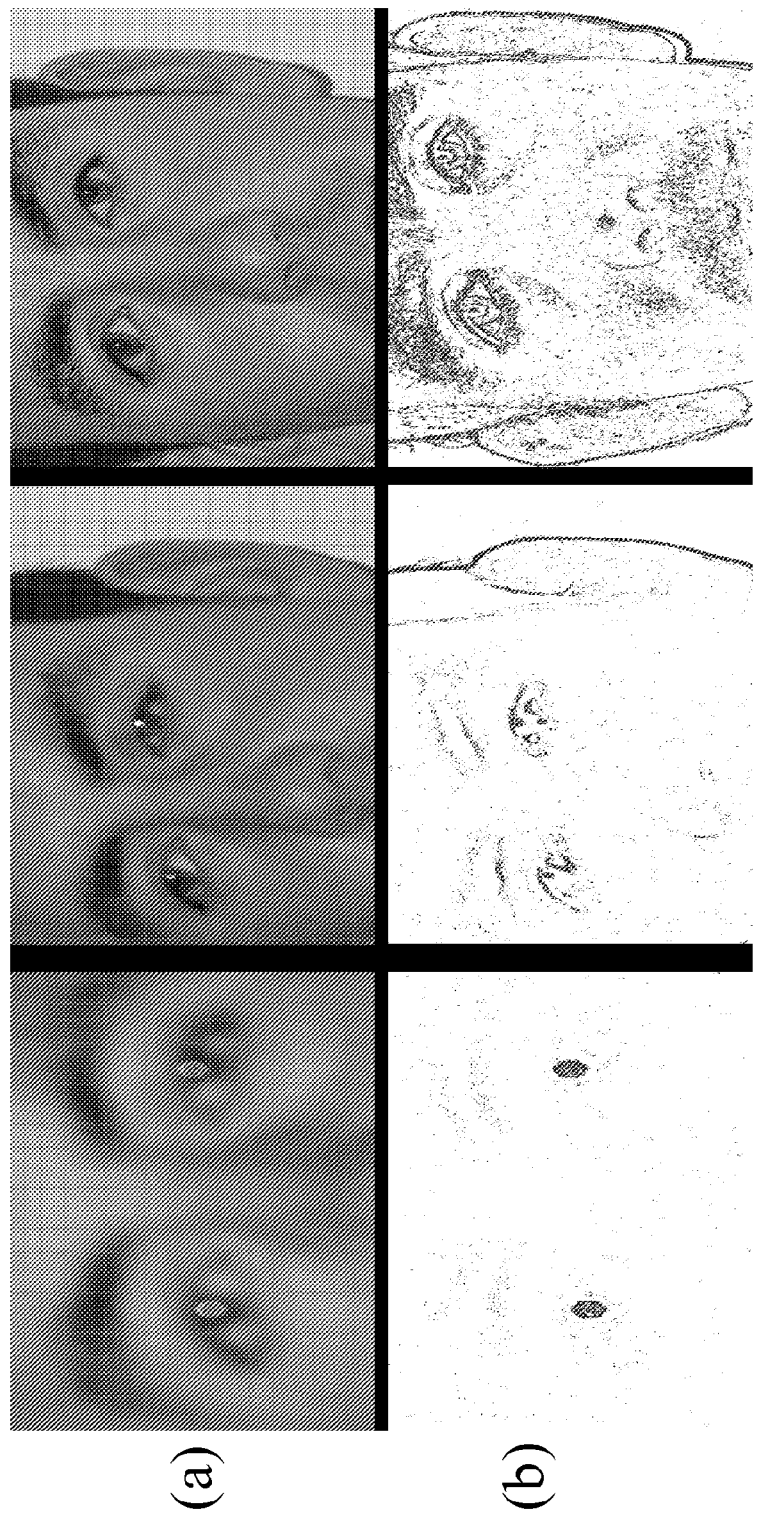
FIG. 3(*a*) illustrates a set of progressively sharper images including eye defects.

As illustrated in FIG. 3(b), for a very defocused image (left), only a few edge points are likely to be detected in the region 50 (of FIG. 2); in a less defocused image (middle), more points are likely to be detected; and in a sharp image (right), many points are likely to be detected.

An edginess factor is the number of recorded points presented as a percentage of the total number of points in a patch region. Thus, edginess factors are determined for each patch in order to ascertain the sharpness of each of the regions within the boundary boxes of the image.

Referring again to FIG. 1, for one embodiment, in order to further identify the degree of sharpness of the candidate regions within the boundary boxes, a glint factor is determined at operation 140. Glint is a specular highlight that may appear in a subject's eye when a digital image of the subject is acquired with a flash. Glint regions of an image have pixels with a substantially red hue and higher saturation and lightness values than pixels in the regions thereabout. In one embodiment of the invention, if very round (both in aspect ratio and elongation), luminous, and de-saturated areas are found within the interior of the candidate regions, the areas are classified as glint areas. Such classification is described in U.S. patent application Ser. No. 11/282,955, now U.S. Pat. No. 7,599,577.

A glint factor is a size of an area of glint represented as a percentage of the area of the defect. The glint factor is directly related to the sharpness of the regions within the boundary boxes of the image in that the greater the glint factor, the more blurred or out of focus the image. Thus, glint factors are determined for each candidate region in the image in order to ascertain the sharpness of those regions in the image.

Although as described for one embodiment both glint factor and edginess factor are considered in order to determine whether and to what extent defects in an image are defocused or blurred, it will be appreciated that such a determination may be based on the edginess factor alone or the glint factor alone.

At operation 150, the defect pixels in the patch are corrected in accordance with conventional defect correction methods. It will however be appreciated that for various alternative embodiments, the pixels in the glint area of the defect region are not corrected so that the corrected regions maintain a natural appearance.

At operation 160 the corrected regions are blurred. For one embodiment an anisotropic diffusion blur method based on a numerical solution of partial derivative equations, is used to blur the corrected pixels. It will be appreciated that any suitable blurring method, for example, simulating Bokeh blur, may be employed for alternative embodiments.

The basis of the anisotropic diffusion blurring approach is the heat propagation equation, which is a second order partial derivative equation (PDE)

$$\frac{\partial I}{\partial t}(x, y, t) = \Delta I(x, y, t)$$

$$\Delta I(x, y, t) = \nabla \cdot (\nabla I(x, y, t)) = I_{xx} + I_{yy}$$

In the equations above, parameter t represents time. The PDE is modeled as an iterative process for which the $n^{th}$ step of its explicit numerical equation is defined as $$I^{n+1}(i, j) = I^n(i, j) + \frac{h^2}{8} \Delta I^n(i, j)$$

where $$\frac{h^2}{8}$$

is the time step

Convolution with a Gaussian kernel produces a blurred image. It can be shown mathematically that running N consecutive iterations is equivalent to convolving the original image I with a Gaussian kernel of width $\sqrt{2Nh}$:

$$I^N = I^0 * G_{\sqrt{2Nh}}$$

As it stands, the numerical equation above will produce an isotropic blur (identical in all directions). However, for one embodiment, it is desirable to avoid blurring some regions and also prevent blur from spreading into those regions, for example, the pixels in the glint area, which were not corrected. In order to achieve this, anisotropy is introduced by means of a weighting function g(x,y,t).

$$\frac{\partial I}{\partial t}(x, y, t) = \nabla \cdot (g(x, y, t) \nabla I(x, y, t))$$

After taking into account some stability criteria, the numerical implementation is defined as:

$$I_{i,j}^{n+1} = I_{i,j}^n + \frac{1}{4} \nabla^- \cdot (g_{i,j} \nabla^+ I_{i,j}^n)$$

$I_{i,j}^{n+1}$ value of pixel located at (i, j) at iteration n+1
$I_{i,j}^n$ value of pixel located at (i, j) at iteration n
$g_{i,j}$ value of weighting function at location (i, j)
Thus, if $g_{i,j}=0$, the pixel located (i,j) does not contribute to the blurring. For numerical stability, backward difference is used for divergence and forward difference for gradient $$\nabla^+ u(i,j) = (u_{i+1,j} - u_{i,j}, u_{i,j-1} - u_{i,j}) \text{ gradient}$$

$$\nabla^- \overline{w}_{i,j} = u_{i,j} - u_{i-1,j} + v_{i,j} - v_{i,j-1} \text{ divergence}$$

$$\overline{w} = (u_{i,j}, v_{i,j})$$

The glint pixels are preferably not utilized for blurring of the surrounding non-glint pixels. Thus, the blurring of the corrected pixels forming a perimeter around the glint area is not affected by the pixels of the glint area. However, it will be appreciated that in alternative embodiments, the glint area pixels may be utilized for blurring the perimeter of corrected pixels around the glint area.

For one embodiment, the edginess factor and the glint factor are used to ascertain whether and to what extent the corrected patch of pixels should be blurred. For example, if the edginess factor is quite low, i.e. less than 25% of the pixels of the defect region have a variation greater than the threshold value, the region is considered to be very defocused and a strong level of blur, for example, 33 iterations of the diffusion application, is applied to the corrected pixels. For an edginess percentage of up to 30%, and a glint area of greater than 20% of the defect region, the region is again considered to be very defocused and a strong level of blur is applied to the corrected pixels. If the edginess factor is between 35% and 50% while the glint area is less than 15% of the defect region, a weak blur, for example 5 iterations of the diffusion application, is applied to the corrected pixels.

At operation 170, the patches of corrected and blurred pixels are then superimposed and blended into the original acquired image. This can be achieved using an alpha-blending mask as follows. The blending mask determines how much information to utilize from the original image and how much information to utilize from the patch. For example, a setting of 0 will mean that no information is derived from the patch, and all the information is derived from the original image such that the pixels remain unaltered. Alternatively, a setting of 255 will mean that all the information is derived from the patch and no information is derived from the original image, such that the pixels are totally altered.

For one embodiment, the blending mask blends the patch into the original image in the following manner. Pixels with a luminance above a certain threshold are not blended, i.e. the blur-blending mask will be set to 0. This is due to the fact that high luminance pixels are strongly affected by neighboring pixels and the blurring of such luminance pixels may result in the elimination or almost elimination of glint. In particular in a situation whereby the image is only slightly defocused or blurred, the near or total elimination of glint would appear unnatural. The pixels of the patch that were identified by the conventional defect detector as being certain defects, e.g. pixels with the highest redness values, are subjected to 100% blending, i.e. the blur-blending mask will be set to 255. Thus, these pixels are represented by their corresponding patch pixels. The pixels of the candidate regions that were not identified by the conventional defect detector as being certain eye defects, i.e. uncertain defects, for example, those pixels with a high but not highest redness value and a >20 in Lab space), are blended in the following manner:

pixels whose closest non candidate region pixel is greater than 3 pixels distant from the pixel are blended by utilizing 70% of the information derived from the corresponding pixels of the patch and 30% information derived from the pixels of the original image.

pixels whose closest non candidate region pixel is 3 pixels distant from the pixel are blended by utilizing 50% of the information derived from the corresponding pixels of the patch and 50% information derived from the pixels of the original image.

pixels whose closest non candidate region pixel is 2 pixels distant from the pixel are blended by utilizing 40% of the information derived from the corresponding pixels of the patch and 60% information derived from the pixels of the original image.

pixels whose closest non candidate region pixel is 1 pixel distant from the pixel are blended by utilizing 30% of the information derived from the corresponding pixels of the patch and 70% information derived from the pixels of the original image.

Pixels identified as holes within the certain defect region, but not having a luminance above the certain threshold to be classified as certain glint pixels, for example, glint-like pixels having a small amount of redness, are blurred in the following manner:

hole region pixels whose closest certain region pixel is 3 pixels distant are blended by utilizing 50% of the information derived from the corresponding pixels of the patch and 50% information derived from the pixels of the original image;

hole region pixels whose closest certain region pixel is 2 pixels distant from the pixel are blended by utilizing 70% of the information derived from the corresponding pixels of the patch and 30% information derived from the pixels of the original image; and hole region pixels whose closest certain region pixel is 1 pixel distance from the pixel are blended by utilizing 90% of the information derived from the corresponding pixels of the patch and 10% information derived from the pixels of the original image.

In general, such regions comprise pixels forming a perimeter around identified glint regions.

In an alternative embodiment, the edginess factor and/or glint factor are employed only to ascertain whether an image is blurred. The degree of defocus is not determined. In one such embodiment, if the image is blurred, a general blurring method is applied to the corrected defect regions of the image independently of the edginess or glint factor used to determine that blurring the corrected defect region was required.

General Matters

Embodiments of the invention include methods and apparatuses for effecting image correction. Embodiments of the invention have been described above with various specific details. It will be appreciated that such details are examples and may be modified.

Embodiments of the invention have been described as including various operations. Many of the processes are described in their most basic form, but operations can be added to or deleted from any of the processes without departing from the scope of the invention.

The operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for digital image flash artefact eye defect correction comprising:
   acquiring a digital image;
   identifying one or more candidate eye defect regions in the image comprising one or more flash artefact regions including pixels in one or more pupil regions that are red, yellow, golden or white, or combinations thereof;
   determining whether the image is blurred;
   correcting the one or more candidate eye defect regions, including replacing said red, yellow, golden or white pixels with corrected pixels to form one or more corrected regions, wherein the corrected regions comprise probabilistically uncertain defect pixels utilizing between 10% and 70% information derived from pixels of the acquired digital image, as well as probabilistically certain pixels not utilizing information from pixels of the acquired digital image, and uncorrected glint pixels having a luminance above a certain threshold to be classified as certain glint pixels; and
   responsive to the image being blurred, anisotropically blurring the one or more corrected regions of the image.

2. The method of claim 1 wherein the determining further comprises determining a degree of blur of the image.

3. The method of claim 2 wherein the blurring further comprises blurring the corrected regions of the image according to the degree of blur.

4. The method of claim 2 wherein the degree of blur is a function of an edginess factor or a glint factor or a combination thereof.

5. The method of claim 4 further comprising applying an edge detector to pixels of an annular region defined between a border of the candidate eye defect region and a surrounding boundary region, to ascertain the edginess factor.

6. The method of claim 5 wherein applying the edge detector comprises determining a number of groups of pixels within the annular region having a change in intensity of greater than a threshold value with respect to neighbouring groups of pixels in the annular region, as a percentage of a total number of groups of pixels in the annular region.

7. The method of claim 6 wherein the group of pixels comprises at least one pixel.

8. The method of claim 7 wherein the annular region comprises a thickness of at least 2 pixels.

9. The method of claim 6 further comprising determining a size of a glint area as a percentage of the candidate eye defect region to ascertain the glint factor.

10. The method of claim 1 further comprising
    obtaining a copy of the candidate eye defect regions;
    wherein said correcting comprises correcting the copy; and
    wherein said blurring comprises blurring the corrected copy.

11. The method of claim 10 further comprising blending the corrected copy into corresponding regions of the acquired image.

12. The method of claim 11, further comprising determining to neither correct, blur nor blend candidate eye defect regions with a luminance above a certain threshold.

13. The method of claim 11, wherein the identifying further comprises labeling the candidate eye defect regions as one of certain eye defect regions, non-certain eye defect regions, or holes within the candidate eye defect regions.

14. The method of claim 11 wherein the blending further comprises blending certain eye defect regions into the image using corresponding corrected and blurred regions.

15. The method of claim 11 wherein the blending further comprises blending the certain eye defect regions into the image using between 30% to 70% of the corresponding corrected and blurred regions.

16. The method of claim 11 wherein the blending further comprises blending the holes within candidate eye defect regions into the image using between 50% to 90% of the corresponding corrected and blurred regions.

17. The method of claim 1, wherein at least the identifying and correcting are performed by a hardware component.

18. A digital image processing device including a processor arranged to correct digital image flash artefact eye defects, comprising:
    a flash artefact eye defect correction component configured both to identify one or more candidate eye defect regions in the image comprising one or more flash artefact regions including pixels in one or more pupil regions that are red, yellow, golden or white, or combinations thereof; and to correct the one or more candidate eye defect regions, including replacing said red, yellow, golden or white pixels with corrected pixels to form one or more corrected regions, wherein the one or more corrected regions comprise probabilistically uncertain defect pixels utilizing between 10% and 70% information derived from pixels of the acquired digital image, as well as probabilistically certain pixels not utilizing information from pixels of the acquired digital image, and uncorrected glint pixels having a luminance above a certain threshold to be classified as certain glint pixels; and
    an anisotropic blurring component configured to determine whether the image is blurred; and, responsive to the image being blurred, anisotropically blurring the one or more corrected regions of the image.

19. The digital image processing device of claim 18, wherein the blurring component comprises an anisotropic diffusion blur component arranged to blur the corrected regions of the image.

20. The digital image device of claim 18, wherein the blurring component comprises an edge detector for determining a degree of blur of the image.

21. The digital image device of claim 20 wherein the edge detector comprises a Prewitt edge detector.

22. The device of claim 18, wherein at least the identifying and correcting are performed by a hardware component.

23. One or more non-transitory processor readable hardware components having code embedded therein for programming one or more processors to perform a method for digital image flash artefact eye defect correction, wherein the method comprises:
    identifying one or more candidate eye defect regions in said image comprising one or more flash artefact regions including pixels in one or more pupil regions that are red, yellow, golden or white, or combinations thereof;
    determining whether said image is blurred;
    correcting said one or more candidate eye defect regions, including replacing said red, yellow, golden or white pixels with corrected pixels to form one or more corrected regions, wherein the corrected regions comprise probabilistically uncertain defect pixels utilizing between 10% and 70% information derived from pixels of the acquired digital image, as well as probabilistically certain pixels not utilizing information from pixels of the acquired digital image, and uncorrected glint pixels having a luminance above a certain threshold to be classified as certain glint pixels; and responsive to said image being blurred, anisotropically blurring said one or more corrected regions of said image.

24. The one or more processor readable media of claim 23, wherein said determining further comprises determining a degree of blur of said image.

25. The one or more processor readable media of claim 24, wherein said blurring further comprises blurring said corrected regions of said image according to said degree of blur.

26. The one or more processor readable media of claim 24, wherein said degree of blur is a function of an edginess factor or a glint factor or a combination thereof.

27. The one or more processor readable media of claim 26, wherein the method further comprises applying an edge detector to pixels of an annular region defined between a border of said candidate eye defect region and a surrounding boundary region, to ascertain the edginess factor.

28. The one or more processor readable media of claim 27, wherein applying said edge detector comprises determining a number of groups of pixels within said annular region having a change in intensity of greater than a threshold value with respect to neighbouring groups of pixels in said annular region, as a percentage of a total number of groups of pixels in said annular region.

29. The one or more processor readable media of claim 28, wherein said group of pixels comprises at least one pixel.

30. The one or more processor readable media of claim 29, wherein said annular region comprises a thickness of at least 2 pixels.

31. The one or more processor readable media of claim 28, wherein the method further comprises determining a size of a glint area as a percentage of said candidate eye defect region to ascertain the glint factor.

32. The one or more processor readable media of claim 23, wherein the method further comprises:
obtaining a copy of said candidate eye defect regions;
wherein said correcting comprises correcting said copy; and
wherein said blurring comprises blurring said corrected copy.

33. The one or more processor readable media of claim 32, wherein the method further comprises blending said corrected copy into corresponding regions of said acquired image.

34. The one or more processor readable media of claim 33, wherein the method further comprises determining to neither correct, blur nor blend candidate eye defect regions with a luminance above a certain threshold.

35. The one or more processor readable media of claim 33, wherein the identifying further comprises labeling said candidate eye defect regions as one of certain eye defect regions, non-certain eye defect regions, or holes within said candidate eye defect regions.

36. The one or more processor readable media of claim 33, wherein said blending further comprises blending said certain eye defect regions into said image using said corresponding corrected and blurred regions.

37. The one or more processor readable media of claim 33, wherein said blending further comprises blending said non-certain eye defect regions into said image using between 30% to 70% of said corresponding corrected and blurred regions.

38. The one or more processor readable media of claim 33, wherein said blending further comprises blending holes within said candidate eye defect regions into said image using between 50% to 90% of said corresponding corrected and blurred regions.

39. One or more processor-readable media as in claim 23, wherein at least the identifying and correcting are performed by a hardware component.

40. A digital image acquisition device, comprising:
a camera including a flash for acquiring a digital image;
a processor;
a memory having code embedded therein for programming the processor to perform a method for digital image flash artefact eye defect correction, wherein the method comprises:
identifying one or more candidate eye defect regions in said digital image comprising one or more flash artefact regions each including pixels in a pupil region that are red, yellow, golden or white, or combinations thereof;
determining whether said digital image is blurred;
correcting said one or more candidate eye defect regions, including replacing said red, yellow, golden or white pixels with corrected pixels to form one or more corrected regions, wherein the corrected regions comprise probabilistically uncertain defect pixels utilizing between 10% and 70% information derived from pixels of the acquired digital image, as well as probabilistically certain pixels not utilizing information from pixels of the acquired digital image, and uncorrected glint pixels having a luminance above a certain threshold to be classified as certain glint pixels; and
responsive to said image being blurred, anisotropically blurring said one or more corrected regions of said digital image.

41. The device of claim 40, wherein said determining further comprises determining a degree of blur of said image.

42. The device of claim 41, wherein said blurring further comprises blurring said corrected regions of said image according to said degree of blur.

43. The device of claim 41, wherein said degree of blur is a function of an edginess factor or a glint factor or a combination thereof.

44. The device of claim 43, wherein the method further comprises applying an edge detector to pixels of an annular region defined between a border of said candidate eye defect region and a surrounding boundary region, to ascertain the edginess factor.

45. The device of claim 44, wherein applying said edge detector comprises determining a number of groups of pixels within said annular region having a change in intensity of greater than a threshold value with respect to neighbouring groups of pixels in said annular region, as a percentage of a total number of groups of pixels in said annular region.

46. The device of claim 45, wherein said group of pixels comprises at least one pixel.

47. The device of claim 46, wherein said annular region comprises a thickness of at least 2 pixels.

48. The device of claim 45, wherein the method further comprises determining a size of a glint area as a percentage of said candidate eye defect region to ascertain the glint factor.

49. The device of claim 40, wherein the method further comprises:
obtaining a copy of said candidate eye defect regions;
wherein said correcting comprises correcting said copy; and wherein said blurring comprises blurring said corrected copy.

50. The device of claim 49, wherein the method further comprises blending said corrected copy into corresponding regions of said acquired image.

51. The device of claim 40, wherein the method further comprises determining to neither correct, blur nor blend candidate eye defect regions with a luminance above a certain threshold.

52. The device of claim 40, wherein the identifying further comprises labeling said candidate eye defect regions as one of certain eye defect regions, non-certain eye defect regions, or holes within said candidate eye defect regions.

53. The device of claim 40, wherein said blending further comprises blending said certain eye defect regions into said image using said corresponding corrected and blurred regions.

54. The device of claim 40, wherein said blending further comprises blending said non-certain eye defect regions into said image using between 30% to 70% of said corresponding corrected and blurred regions.

55. The device of claim 40, wherein said blending further comprises blending holes within said candidate eye defect regions into said image using between 50% to 90% of said corresponding corrected and blurred regions.

56. The device of claim 40, wherein at least the identifying and correcting are performed by a hardware component.

* * * * *